METHOD AND APPARATUS FOR COOKING

Filed Aug. 18, 1971 9 Sheets-Sheet 1

Feb. 13, 1973 R. J. W. CONSTABLE 3,716,687

METHOD AND APPARATUS FOR COOKING

Filed Aug. 18, 1971 9 Sheets-Sheet 8

United States Patent Office 3,716,687

Patented Feb. 13, 1973

3,716,687

METHOD AND APPARATUS FOR COOKING

Ronald Jack Walker Constable, Eythorne, near Dover, England, assignor to Hirst Microwave Industries Limited, Aylesham, near Canterbury, Kent, England Filed Aug. 18, 1971, Ser. No. 172,860
Claims priority, application Great Britain, Aug. 18, 1970, 39,785/70; Feb. 5, 1971, 4,054/71
Int. Cl. H05b 69/06
U.S. Cl. 219—10.55 54 Claims

ABSTRACT OF THE DISCLOSURE

Apparatus for cooking food comprises the combination of a hot plate or grill device arranged in a microwave oven so that steak or chops or like food of relatively small thickness can be rapidly cooked. The hot-plate comprises conductive material forming a short circuit for the microwave field and this is considered to limit the depth of penetration of the microwave energy into the food, thus enabling rare and medium steaks or the like to be cooked. Further, it is found that the food can be properly browned on its surface, as well as correctly cooked in the interior regions, in very short cooking times. It is preferred that the oven also be provided with a fan for rapidly recirculating the air in the oven to enable food to be cooked by the combination of microwave energy and recirculated air at cooking temperatures, this method being particularly applicable to roasts such as roast beef, roast chicken etc. A removable tray may be provided for supporting the food in or near the centre of the microwave field during this latter method. The hot-plate itself, or an auxiliary heater, may be employed for heating the air during this method. In one embodiment, the fan used for recirculating the air is partially microwave transparent and partially of conductive material and is arranged so that the conductive parts act as a mode stirrer. The fan is preferably located behind a shield plate in the microwave cavity to draw air through a central aperture in the plate and blow it around the edges and in the case where the fan acts as a mode stirrer, the shield plate is of heat resistant microwave transparent material. The hot-plate may have a ridged surface for forming stripes on steak or the like and an auxiliary hot-plate may be provided, having a plane food supporting surface, for placing on the ridged surface when it is desired to cook food without forming stripes on it.

FIELD OF INVENTION

This invention relates to methods and apparatus for cooking.

PRIOR ART

The conventional method of cooking food comprises applying heat to the surface of the food and allowing the heat to conduct through the body of the food to be cooked. As is well known, the heat may be applied in various ways, for example by placing the food in contact with the bottom surface of a heated pan, immersing the food in heated water, exposing the surface of the food to infra-red radiation, and placing the food in an oven in which the air is heated to a high temperature.

Since these methods rely upon the conduction of heat through the food to raise the interior portions of the food to the required temperature, they are necessarily relatively slow. With a view to speeding up the cooking process, the heating of food by microwave energy has come into use. Of course it is necessary the food be of a lossy material so that heat can be generated by absorption of the microwave energy. Such energy rapidly penetrates the food. In the microwave cooking methods hitherto proposed, the food is placed inside a cavity having conductive walls which reflect microwave energy, and the microwave energy is supplied to the cavity. The food is positioned clear of the walls of the cavity in order that it is subjected to reflected energy from many directions.

Although microwave energy is capable of rapidly cooking food, it is not capable alone of adequately browning the surfaec of food. Many attempts have been made in the prior art to solve this problem, by the provision in microwave ovens of infra-red or radiant heating element which are intended to brown the surface of the food while the microwave energy cooks the interior regions. These proposed solutions have not been entirely satisfactory since even browning has not been attainable because the radiant heat applied to the surface of the food originates in a certain small number of specific directions e.g. above and below the food. A satisfactory solution to the problem which has been devised involves the subjecting of the food to the combination of microwave energy and recirculated air heated to temperatures at which the air is effective for cooking the food, preferably temperatures well in excess of the boiling point of water and in particular temperatures of about 450° F. This cooking method, and apparatus for carrying it out, is fully described and claimed in our British patent specification No. 1,172,918 and in patents and patent applications corresponding thereto in foreign countries. This method is especially suitable for cooking relatively thick foods, such as roast beef or chicken, and for cooking frozen pies.

Despite the considerable number of proposals in the prior art for rapidly cooking food to a palatable and in paraticular a browned condition, no method or apparatus has hitherto been proposed, to the best of my knowledge, in which it is possible to rapidly cook steak and other relatively thin foods to a condition in which the surface is properly browned and the interior regions, particularly in the case of steak, are not over-cooked. That is to say, it has not hitherto been possible to rapidly cook steak or the like to a "medium" or "rare" condition. The use of microwave has not been satisfactory since the microwave energy has penetrated so deeply that the steak or the like has been rapidly cooked right through thus making it impossible to produce a "medium" or "rare" steak.

THE PRESENT INVENTION

The present invention provides a method and apparatus for cooking which employs heating the food by contact with a hot-plate member heated to a temperature at which it is capable of cooking the food and microwave energy. The hot-plate member is made of conductive material.

It is to be understood that the expression "hot-plate member" is not intended to limit the invention to the use of a member which is relatively thin like a plate. Rather this term is used in the way that the expression "hot-plate" is used in the art of cooking: that is to say the hot-plate member constitutes what may be termed a griddle in the United Kingdom or a grill in the United States. Thus, whilst it is possible that the hot-plate member be in the form of a relatively thin plate, it is equally possible for the hot-plate member to be of other configurations such as a solid block of material of substantial thickness.

The invention further provides in an alternative aspect a cooking method in which the food to be cooked is placed in contact with a heated metallic wall of a metallic walled cavity and microwave energy is supplied to the cavity so that the microwave energy and the heat conducted to the food from the heated wall both contribute to the cooking of the food.

In a further aspect, the invention provides cooking apparatus in which electrically conductive walls define a cavity to which microwave energy may be supplied and at least one of the walls is adapted to support food and is heated so that the heat from the wall and the microwave energy may both contribute to the cooking of the food.

The invention is particularly advantageously applied to the cooking of food which is of relatively narrow cross section compared to the wavelength of the microwave energy supplied, for example steaks, in particular where it is desired to cook outer portions of the food more thoroughly than inner portions, as in preparing a medium or rare steak. The advantage of this application of the invention over known methods involving subjecting the food to infra-red radiation or placing the food in contact with a heated plate is that cooking with the present invention is much more rapid. The advantage of this application of the present invention over cooking the food by microwave energy in the known manner is that preferential cooking of the outer regions of the food over the inner regions can be more easily achieved. It is considered that in regions of the cavity close to the walls the amplitude of the microwave field decreases to zero at the surface of the walls. Thus, the portions of the food further from the walls are subjected to more energy than the portions closer to the wall. If the food is turned over half way through the cooking operation opposite outer portions can be cooked more thoroughly by the microwave energy than inner portions.

For cooking meat, such as steak, the temperature of the hot plate member would preferably be above 450° F., more preferably over 550° F. or 600° F. It is thus preferred that the apparatus is such that the hot-plate can be heated to temperatures within the range of say 450° F. to 750° F. If the apparatus is to be used for cooking other types of food as well, such as pastries, it is preferable that the hot-plate can be maintained, for example by a thermostat, at lower temperatures for example temperatures down to 350° F.

If it is desired to provide a cooking apparatus which is particularly versatile, the present invention and the invention described in the aforesaid British patent specification can be combined in a single apparatus. In this case separate heating means can be provided for the hot-plate and for the air or if desired for reasons of economy the heating means for the hot-plate can also be utilised for heating the air. Control means would preferably be provided for maintaining the air temperature at the conventional temperatures to which ovens can be heated in particular temperatures in the range 230° F. to 550° F. It is considered that temperatures less than 230° F. are not effective for cooking food and in fact it is preferred that air temperatures substantially in excess of this temperature, for example at 450° F., are utilised when the invention of the aforesaid specification is carried out.

Thus, where the aforesaid combined apparatus is provided it will be possible to carry out a wide variety of cooking operations on the same apparatus.

The present invention will be described further by way of example with reference to the accompanying drawings in which:

FIG. 16 is a plan view of an alternative form of fan which may be employed in the apparatus of FIG. 13.

Figure 1:
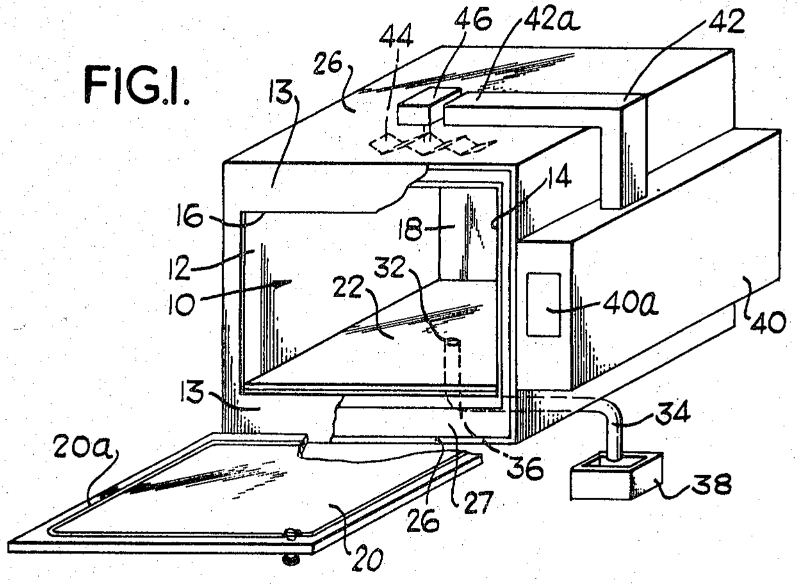
FIG. 1 illustrates cooking apparatus in accordance with a first embodiment of the invention.

Referring to FIG. 1, the cooking apparatus, in the form of an oven, comprises a cavity 10 which is defined by metallic side walls 12 and 14, a metallic top wall 16, a metallic back wall 18, a metallic door 20 and a metal bottom plate 22. The walls 12, 14, 16, 18 and 22 are all surrounded by an outer casing 26 which incorporates thermal insulation 27. The door 20 also incorporates thermal insulation, and is provided with a radiation seal or screen 20*a* which engages a metallic flange 13 integral with or welded to the walls of the cavity 10.

Figure 2:
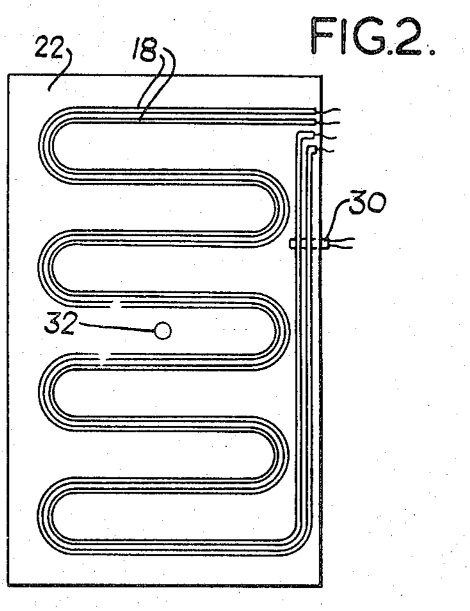
FIG. 2 is a diagramatic plan view of a part of the apparatus of FIG. 1.

The bottom plate 22 is made of cast iron and a pair of electric heating elements 28 are cast into the plate 22 in the configuration shown in FIG. 2 so that when the heating elements 28 are energised the plate 22 is heated substantially uniformly. The plate 22 thus constitutes a so-called hot-plate, sometimes known as a griddle or grill. A temperature sensor 30 is also cast into the plate 22 to enable the temperature of the plate to be thermostatically controlled by controlling the power supplied to the heating elements 28. The plate 22 is securely fixed to the walls 12, 14 and 18 of the cavity 10, for example by welding, and is of slightly dished shape. At the centre of the plate 22 a drain hole opening 32 is formed, this also being at the centre of the "dishing" and the opening 32 is connected to one end of a conduit 34 which extends out of the oven through an opening 36 in the bottom wall 24 and whose other end projects into a receptacle 38.

A power supply casing 40 is mounted on one side of the oven and contains power supply and control circuitry for the elements 28 and the temperature sensor 30 and also contains a magnetron, and its associated power supply and control circuitry, which is coupled to a waveguide 42, the end 42*a* of which is connected to the interior of the cavity 10 through the top wall 16 and associated top of the outer casing 26 so that when the magnetron is energised microwave energy is supplied to the cavity 10. The connection of the waveguide 42 into the cavity 10 is conventional and need not be described in detail.

A conventional mode stirrer 44 is mounted rotatably in the upper part of the cavity 10 and is driven by a motcr 46 mounted on the top of the oven. Mode stirrers are known and it is unnecessary to described further the construction and operation of the mode stirrer 44.

Figure 3:
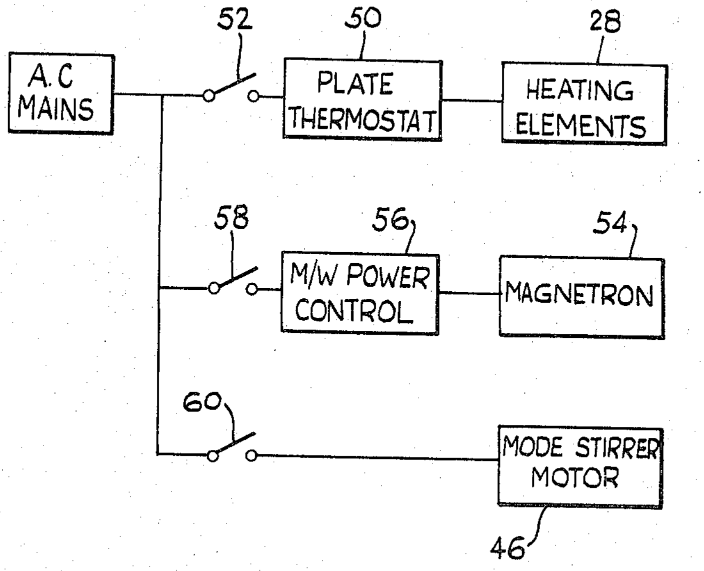
FIG. 3 is a block diagram of the circuitry employed in the apparatus of FIGS. 1 and 2.

As illustrated in FIG. 3, the power supply circuitry includes a plate thermostat 50, incorporating the temperature sensor 30, and a switch 52 through both of which the heating elements 28 are connected to the A.C. mains. The magnetron, indicated in FIG. 3 by the reference number 54, is connected through magnetron power control circuitry 56 and a switch 58 to the A.C. mains. The mode stirrer motor 46 is connected through a switch 60 to the A.C. mains. The various knobs associated with the switches 52, 58 and 60 and the thermostat 50 and microwave power control 56 are provided on a control panel 40*a* on the front of a power supply casing 40.

A vent (not shown) may be provided for removing from the cavity smoke and fumes produced during cooking. The vent would be dimensioned to be below the cut-off value for the frequency of the microwave field. The vent would also ensure that pressure cannot build up in the cavity. Pressure build up is undesirable as it could cause a leak of microwave energy through the radiation seal on the door.

In operation, the electric heating elements 28 are energised to raise the temperature of the plate 22 to a level suitable for cooking food, preferably in the range 450° F. to 750° F., e.g. about 600° F. A temperature range of the same order might be expressed in degrees C as 250° C. to 400° C., e.g. about 300° C. Food to be cooked, preferably steak or chops or the like is then placed on the plate 22 and after a moment turned over. This "sears" the food surface and seals in the natural juices. The door 20 is then closed, and in the closed position forms a seal against leakage of microwave energy from the cavity 10, and the magnetron is energised to supply microwave energy to the cavity 10. Preferably half way through the cooking operation, or at any other suitable time as determined by the nature of the food to be cooked, the microwave energy is discontinued, the door 20 opened (the door 20 may incorporate a switch for automatically discontinuing the microwave energy when it is opened), the food is turned over, the door 20 is closed again and the magnetron reactivated to again supply microwave energy to the cavity 10.

When the cooking has been completed, the plate 22 can be cleaned by scraping it with a conventional tool so as to discharge any fat or the like through the opening 32 and into the conduit 34 which deposits the fat or the like in the receptacle 38. The opening 32 and conduit are dimensioned to prevent leakage of microwave energy therethrough.

Figure 4B:
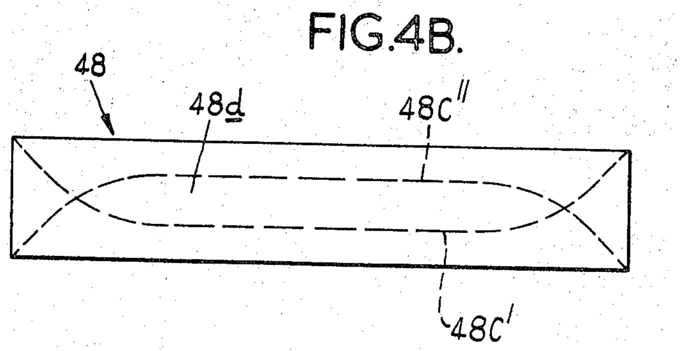
FIGS. 4A and 4B are diagrams for illustrating the theory which is believed to explain the effects achieved by cooking in accordance with the invention.
Figure 4A:
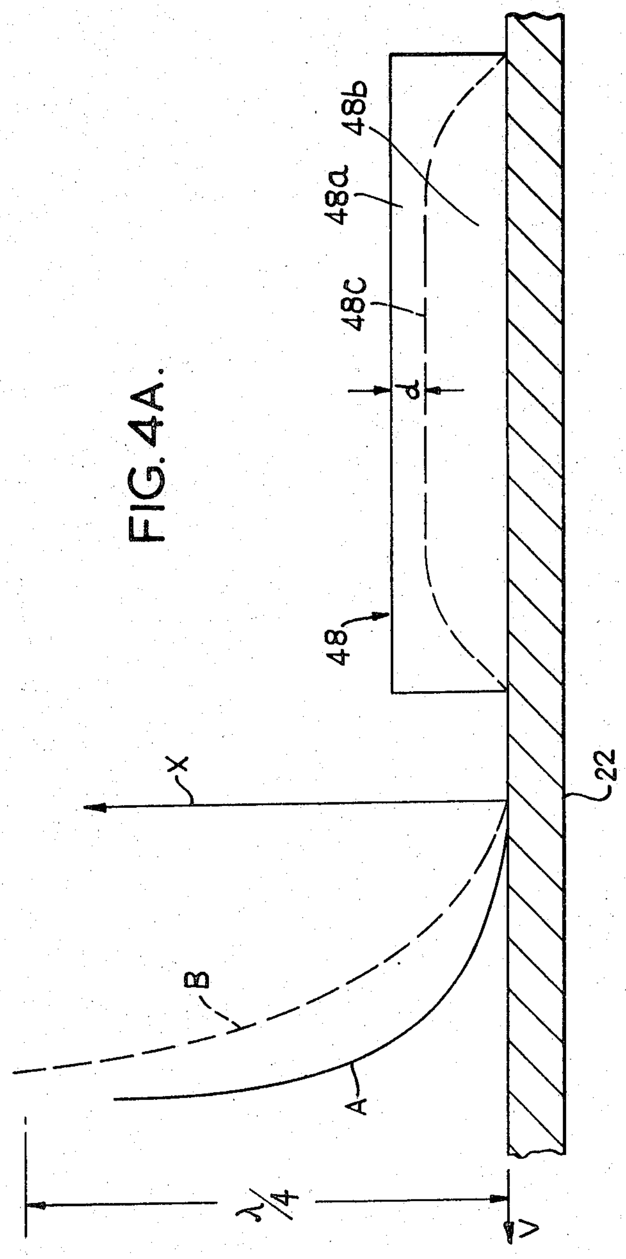

Reference will now be made to FIGS. 4A and B to explain the theory which is believed to be involved in cooking in accordance with the invention. Contrary to popular belief, food is not cooked by microwave energy from the inside outwards. In fact, the power in the microwave field decreases with increasing depth in the food. Typically, the depth of penetration of microwave energy supplied at 2 kw. is 1" to 1¼" in food. Accordingly, if food of a thickness of 1" to 2", which is typical of the thickness of steak, is placed in the centre of a microwave field, it may be rapidly cooked right through making it difficult or impossible to produce a medium or rare steak.

In the present invention, however, the depth of penetration of the microwave energy is reduced. FIG. 4A illustrates a piece of food 48, such as a steak, placed upon the hot plate 22. The curve A is a plot of the maximum amplitude of the electric component of the microwave field (V) against distance (X) from the surface of the plate 22 assuming that no food is present. It will be seen that at the surface of the plate 22 V is zero. This is because the plate 22, being conductive, acts as a short circuit to the electric component of the microwave field so that the amplitude of this component at that point must be zero. The curve A illustrates that the maximum amplitude of the electric component (V) of the microwave field increases to a maximum at a distance (X) of approximately ¼ wavelength ($\lambda/4$) of the microwave field. Thereafter, the maximum amplitude V decreases to zero at ½ wavelength distance ($\lambda/2$), although this is not shown in FIG. 4A.

Thus, when the food 48 is placed on the conductive hot-plate 22, the depth of penetration is a function of both the rate of absorbtion of the energy by the food and the decrease in maximum amplitude of the field as represented by the curve A.

As a result, the upper regions 48*a* of the food 48 are effectively cooked by the microwave energy whereas the lower regions 48*b* are not. The boundary between the regions 48*a* and 48*b* is indicated by the line 48*c*, which represents the effective depth of penetration. Typically, the depth of penetration shown at *d* on FIG. 4A may be about ⅜" in a field of 2 kw. with a steak whose thickness is 2".

It has been found that where the food 48 is turned over half way through the cooking operation, nicely done medium and rare steaks or the like can be cooked very rapidly. This can be seen in the illustration of FIG. 4B in which the lines 48*c'* and 48*c"*, representing respectively the depth of penetration of the microwave energy before and after the steak has been turned over, enclose a central zone 48*d* upon which the microwave energy has had substantially no effect. Thus, the cooking of the central zone 48*d* is substantially only by the conduction of heat from the surrounding regions and accordingly a medium or rare steak is produced as required.

It should be appreciated that at any given point along the axis X, the amplitude of the electric component of the microwave field is continuously varying between zero and a maximum value since microwaves are continuously moving towards the surface and being reflected from the surface. It is for this reason that the curve A is said to be a plot of the maximum amplitude against distance rather than merely the "amplitude" against distance.

The curve B in FIG. 4A represents the maximum amplitude of the electric component of a microwave field of lower power than that to which the curve A relates and as seen from FIG. 4, the rate of increase of V with X is lower on curve B than curve A. Thus, with lower power levels, the depth of penetration of the microwave energy is further reduced and the size of the central zone 48*d* correspondingly increased, producing a rarer steak. Conversely, if the microwave power level is increased the size of the zone 48*d* can be reduced or this zone can be made to disappear producing a well cooked steak. The cooking time may also be varied, as with conventional cooking.

Preferably, the magnetron is capable of delivering up to 2 kw. of microwave power and it may be conveniently switchable to operate as desired at quarter power, half power, three-quarter power and full power. Variation in the power output of the magnetron can be achieved in any conventional way.

The following table will illustrate a number of examples of cooking with the invention. In the examples, the temperature of the hot plate was about 300° C. (a little under 600° F.) and the microwave power, when used, was at 2 kw. continuous.

TABLE I

| Food | Initial weight, grams | Cooking method | Results |
|---|---|---|---|
| Rump steak | 241.5 | After initial searing: Hot plate plus M/W for 1 min.—Steak turned over after ½ min. | The steak was medium cooked and the outside surface had been nicely browned. |
| Do | 236.5 | After initial searing: Hot plate only for 6 mins.—Steak turned over at 3 mins. | The final appearance of the steak was of a medium cooked steak but the outside was burnt. The steak was examined after one minute of cooking time and was still virtually uncooked apart from the surface which was slightly browned. |
| Two pork chops. | 181.0 | After initial searing: Hot plate plus M/W for 1 min.—Chops turned over after ½ min. | Chops well cooked. |
| Do | 175.0 | After initial searing: Hot plate only for 5 min.—Chops turned over after 2½ mins. | Chops well done. |
| Three lamb cutlets. | 318.0 | After initial searing: Hot plate plus M/W for 1 min.—Cutlets turned over after ½ min. | The food was well cooked. |
| Do | 299.5 | After initial searing: Hot plate only for 5 mins.—Cutlets turned over after 2½ mins. | The cutlets were less well cooked than in the previous example in which microwave power was used as well, but could be regarded as edible. |
| Three rashers of bacon. | 105.0 | Hot plate plus M/W for 30 secs.—Bacon turned over after 15 secs. | The bacon was well cooked but, although the fat was clearly cooked right through its outer surface was browned or crispy in appearance only in places. |
| Do | 112.0 | Hot plate only for 3 mins.—Bacon turned over after 1½ mins. | The bacon was cooked to an edible state but the fat was still slightly stringy and was not crisp at all. |

As noted in the first of the above comparative tests (steak), although it is possible to cook a steak in one minute in accordance with the invention and obtain a properly browned surface, after one minute of cooking with the hot plate alone not even the surface of the steak is properly browned. There is therefore a synergistic effect in that the microwave energy and the hot-plate together can produce a properly browned steak in this short period of time, whereas neither alone could do so.

Although in the above examples, the microwave power level was 2 kw. in each case, the cooking of the food by the right amount, e.g. medium steak and well done pork chops, was nevertheless achieved by an appropriate choice of the cooking time having regard to the weight of the food being cooked.

On the other hand, nicely cooked rare, medium and well done steaks of a given weight can be obtained in a constant cooking time by using low, medium and high microwave power levels respectively; the temperature of the hot plate also may remain constant. Hence, it is possible for a relatively unskilled cook to produce correctly cooked rare, medium and well done steaks without any necessity for him to accurately judge the time of cooking since this will always be constant provided of course that the steaks are of approximately the same weight. The oven may thus be provided with a microwave power control which may be calibrated for cooking steak rare, medium or well done. Where the oven is to be used in a restaurant, the approximate size of the steak can be predetermined so that the calibration of the oven can be for a given size of steak. Where different sizes of steak are to be cooked either different cooking times will be required or different power levels will be required. Either a timer calibrated according to the steak size e.g. small, medium and large size may be provided or an additional power control calibrated according to steak size may be provided, the latter power control co-operating with the former and being such that regardless of the size of the steak the cooking time still remains constant to obtain rare, medium and well done steaks.

Figure 5:
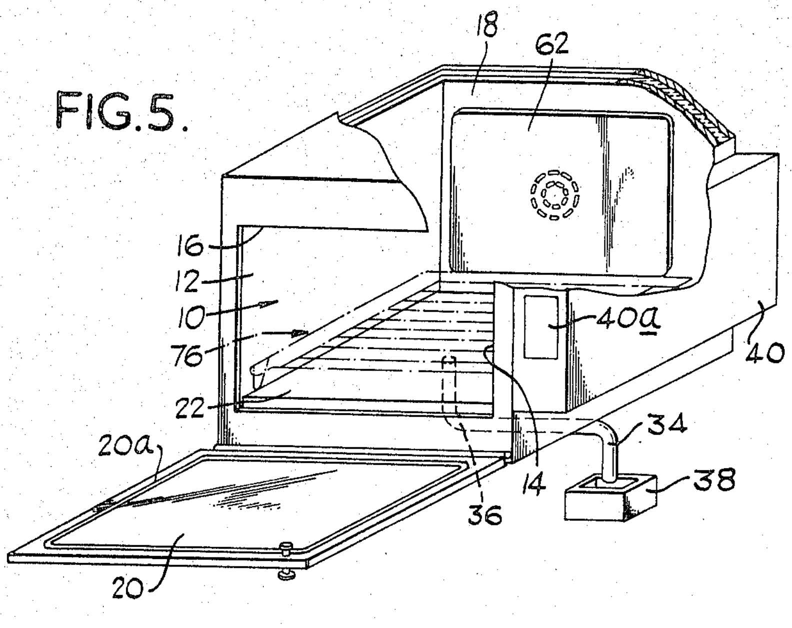
FIG. 5 is an illustration similar to FIG. 1 of cooking apparatus in accordance with a second embodiment of the invention.
Figure 6:
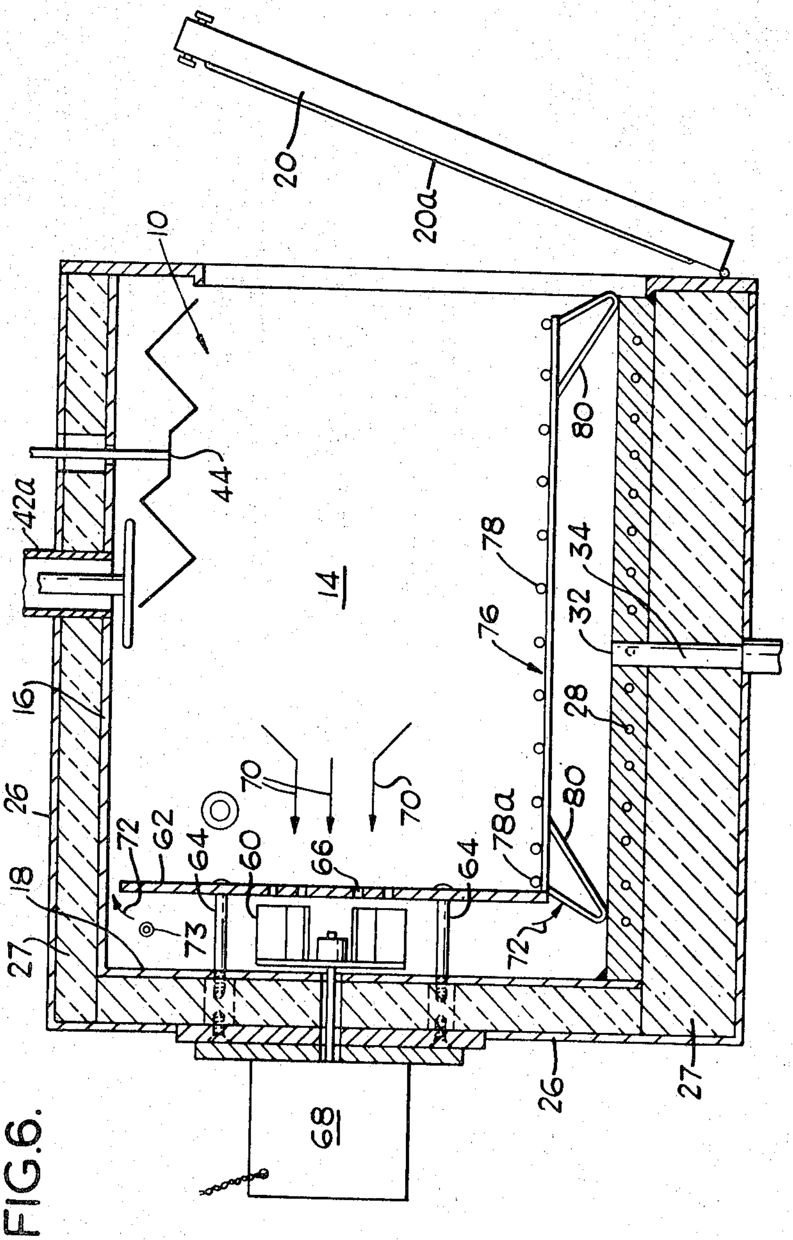
FIG. 6 is a sectional side view of the apparatus of FIG. 5.
Figure 7:
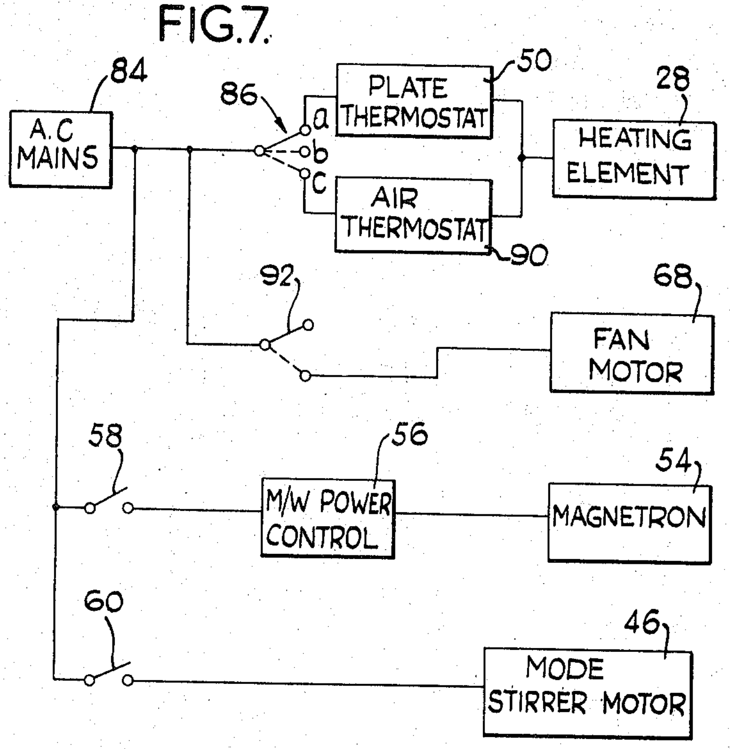
FIG. 7 is a block diagram of the circuitry employed in the apparatus of FIGS. 5 and 6.

Reference will now be made to FIGS. 5 to 7 of the accompanying drawings. Many parts of the embodiment of FIGS. 5 to 7 are the same as those of the embodiment of the invention of FIGS. 1 to 3. Accordingly, the same reference numbers are used for the same parts, and redescription of these parts will be unnecessary.

The embodiment of FIGS. 5 to 7 differs from that of FIGS. 1 to 3 in that means is provided for heating the air in the cavity to cooking temperatures and for recirculating the air, and thus this apparatus also embodies the invention of the aforesaid patent specification No. 1,172,918.

A fan 60 is mounted in the cavity 10 at the back of the oven in a space defined between the back wall 18 and a metallic shield plate 62 which is supported on rods 64 in spaced parallel relationship with the back wall 18. The shield plate 62 is rectangular in shape and its four edges are respectively spaced from the side walls 12, 14, the top wall 16 and the bottom plate 22. A central region of the shield plate 62 contains a plurality of apertures 66, this region being immediately adjacent the fan 60. A motor 68 for driving the fan 60 is mounted on the back of the oven, and when the fan 60 is driven, air is drawn by the fan through the apertures 66 in the direction of the arrows 70 and is forced back into the main part of the cavity 10 by passing over the edges of the plate 62 in the direction of the arrows 72.

A further temperature sensor 73 is mounted in the space between the wall 18 and the shield plate 62 to sense the temperature of the air as recirculated by the fan 60. The sensor 73 is near the top of the oven so as to be away from the heated plate 22. If desired, a shield may be provided to make quite sure that any radiant heat from the plate 22 cannot fall on the sensor 73.

A metallic support 76, comprising a rectangular grid-like shelf portion 78 and four splayed out legs 80 at the corners of the portion 78, is supported on the plate 22. The support 76 is removable. At the rear of the cavity 10, the back edge 78*a* of the shelf portion 78 abuts the lower edge of the shield plate 62. The lower extremities of the legs 80 engage in the corners between the side walls 12, 14 and the hot plate 22. Thus, the support 76 when mounted in the oven is fixed against sideways movement but the support 76 is easily removable by simply lifting it out.

As shown in FIG. 7, the power supply and control circuitry contained in the casing 40 is such that the supply of power to the heating element 28 from A.C. mains 84 is controlled by a switch 86 having three positions *a*, *b*, *c*. When the switch 86 is in position *a*, power is supplied to the heating element 28 through the plate thermostat 50 of which the temperature sensor 30, embedded in the plate 22, forms a part. When the switch 86 is in its position *b*, the power supply to the heating element 28 is cut off. When the switch 86 is in its position *c*, power is supplied to the heating element 28 through an air thermostat 90 of which the temperature sensor 73 forms a part.

A further switch 92 controls the fan motor 68 so that the fan can be operated when required. If desired, the switch 92 could be ganged to the switch 86 so that when the switch 86 is in its position *c* the fan motor 68 is also energised whereas if the switch 86 is in its positon *a* or *b* the fan motor 68 is de-energised. Whether or not the switches would be ganged together depends upon when one wishes the fan to run.

The mode stirrer would preferably be run all the time so that it will not become clogged up with grease.

In order to cook steaks or chops or the like in the apparatus illustrated in the drawings, the tray 76 is removed and the switch 86 is set to its position *a*. The electric heating elements 28 are energised to raise the temperature of the plate 22 to a level suitable for cooking food, and the cooking operation is carried out as previously described in connection with FIGS. 1 to 4.

In order to cook food by the method involving combined microwave energy and recirculated air heated to cooking temperatures, the support 76 is located in position in the oven as shown in FIG. 6 and in chain lines in FIG. 5, and the switch 86 is set to its position *c* so that power is supplied to the heating element 28 through the air thermostat 90. This thermostat 90 is set in the desired position so that the air temperature is maintained at the desired level. This temperature should be in excess of 230° F., preferably about 450° F. but higher temperatures, for example up to 600° F., may if desired be employed.

The food to be cooked is placed on the shelf 78, the door 20 is closed and the switch 96 is also closed so that the magnetron is energised and the food is subjected simultaneously to microwave energy and hot air recirculated by the fan 60 whose motor 68 is energised by closure of the switch 92 when the switch 86 is moved to its position *c*. The fan is such that a very rapid recirculation of the air in the oven takes place. For example it may rotate at 2,500 to 3,000 r.p.m., say 2,700 r.p.m.

The vent (not shown) previously referred to for the removal of smoke and the like when cooking with the hot-plate and microwave energy would preferably be adjustable in the present invention and would be partially closed during cooking with microwave energy and hot recirculated air. In the partially closed condition the vent would ensure that the pressure in the cavity does not rise significantly above atmosphere but would not result in undesirable loss of the vapours of cooking.

The following table will illustrate a number of examples of cooking food by this method. In the examples, the air temperature was 450° F. and the microwave power, when used, was at 2 kw. continuous.

TABLE II

| | Method of cooking | Temperature degrees C. after cooking for 8 minutes |
|---|---|---|
| Pre-cooked frozen food in metal foil container. Initial temperature minus 20° C. | Microwave only | +20 with certain randomly positioned areas at 40. |
| | Hot air only | −10 increasing to −5 after about 5 minutes. |
| | Combined microwave and hot air. | +95 The food was ready to eat. |
| Frozen raw chicken pie. Initial temperature minus 20° C. | Microwave only | +10 with up to +40 in certain randomly disposed areas. |
| | Hot air only | −10. |
| | Combined microwave and hot air. | Over +100. The food was nicely cooked ready to eat. The surface was nicely browned. |
| | **Method of cooking** | **Temperature degrees C. after cooking for 7 minutes.** |
| Raw 2 lb. chicken. Initial temperature: Room temperature. | Microwave only | Over +100 (but chicken pale and unappetising). |
| | Hot air only | +40. |
| | Combined microwave and hot air. | Over +100 (chicken was browned on its surface and had appetising appearance, and was nicely cooked throughout). |

It will be seen from the foregoing description that the cooking apparatus according to this embodiment of the present invention is highly versatile and enables a variety of different types of food to be very rapidly cooked to a palatable condition.

Figure 8:
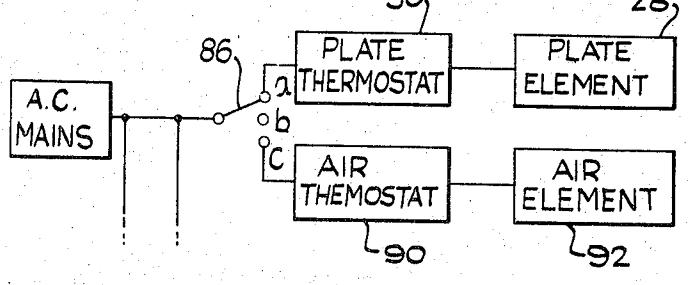
FIG. 8 is a block diagram showing a part of the circuitry employed in a modification to the embodiment of FIGS. 5 to 7.

Referring now to FIG. 8, the embodiment shown therein is basically similar to that of FIGS. 5 to 7 except that an auxiliary heating element 92 is provided for heating the air. Thus, when the switch 86 is in its position *c*, the element 28 is cut off and the element 92 is energised through the air thermostat 90. Conversely, when the switch 86 is in its position *a* the air element 92 is cut off. Thus, the switch 86 acts as a means to ensure that only one of the two elements 28 and 92 can be energised at any given time.

The disposition of the element 92 in the cavity is not illustrated. Preferably this would be disposed behind the shield 62 and surround partially or completely the fan 60, for example as illustrated in FIG. 2 of British patent specification No. 1,172,918. The temperature to which the element 92 can heat the air would be the same as that to which the element 28 heats the air in the embodiment of FIGS. 5 to 7 when used for cooking by the combination of microwave energy and heated recirculated air.

It will be understood that in this modification the fan motor, magnetron, mode stirrer and the associated controls will also be provided although not shown in FIG. 8.

Figure 9:
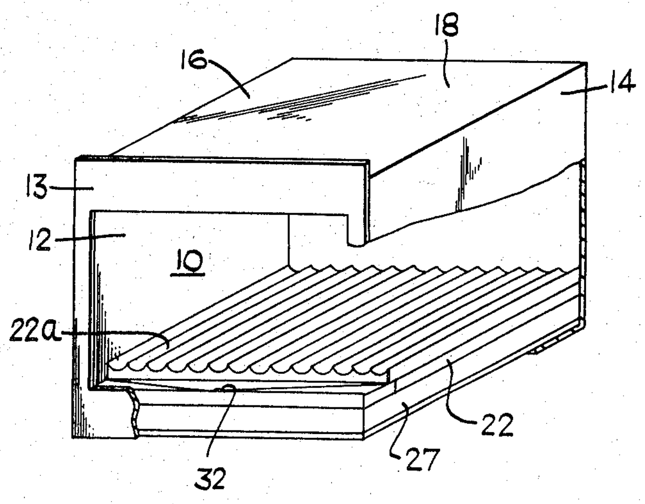
FIG. 9 is a diagram of a part of a cooking apparatus according to the invention illustrating a further modification.

In the modification of FIG. 9, which illustrates only the means defining the cavity 10, the plate 22 has its upper surface formed with a plurality of grooves 22*a* running from front to back of the cavity. The drain hole 32 is provided at the front of the cavity and the arrangement is such that fat or the like can drain along the grooves 22*a* towards the front and eventually leaves the cavity through the drain hole 32. The purpose of the grooves 22*a* is to provide a striped pattern on the surface of meat, particularly steaks, cooked by the method of the present invention.

Figure 10:
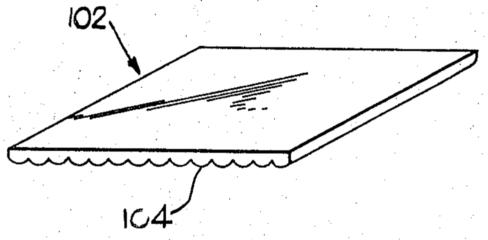
FIG. 10 illustrates a removable auxiliary plate which may be used with the modified apparatus of FIG. 12.

If it is desired to cook food on which this pattern is not required, an auxiliary removable plate 102 illustrated in FIG. 10 can be inserted and rest on top of the plate 22 of FIG. 9. The auxiliary plate 102 is provided with ribs 104 which are complementary to the grooves 22*a* and thus an intimate thermal contact is provided between the plates 22 and 102 ensuring that heat is properly conducted to the surface of the plate 102.

Figure 11:
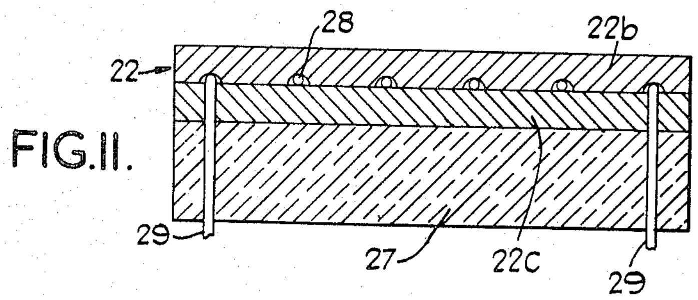
FIG. 11 is a sectional view of a modified form of a hot-plate member which may be used in the apparatus of any of FIGS. 1 to 10.
Figure 12:
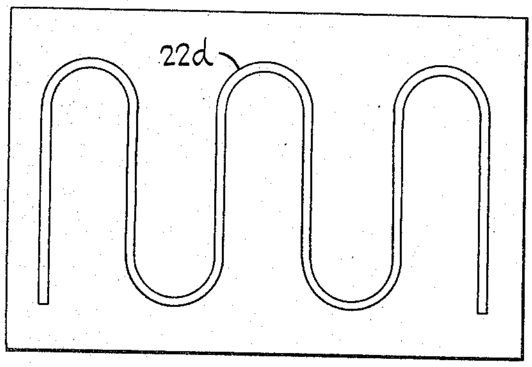
FIG. 12 is a view of the underside of the hot-plate member of FIG. 11.

In the modification of FIGS. 11 and 12, the hot plate member 22 consists of upper and lower plates 22*b*, 22*c*. The upper plate 22*b* is formed with a serpentine groove 22*d* as shown in FIG. 12 on its lower surface and this receives the heating element 28. The upper plate 22*b* is removable, leaving the heating element 28 in place and exposed for servicing. Power leads 29 for the heating element 28 project downwardly through the heat insulation 27 and pass to the power supply casing which, if desired, may be provided beneath the oven instead of on the side of it as illustrated in the earlier figures of the drawings.

Figure 13:
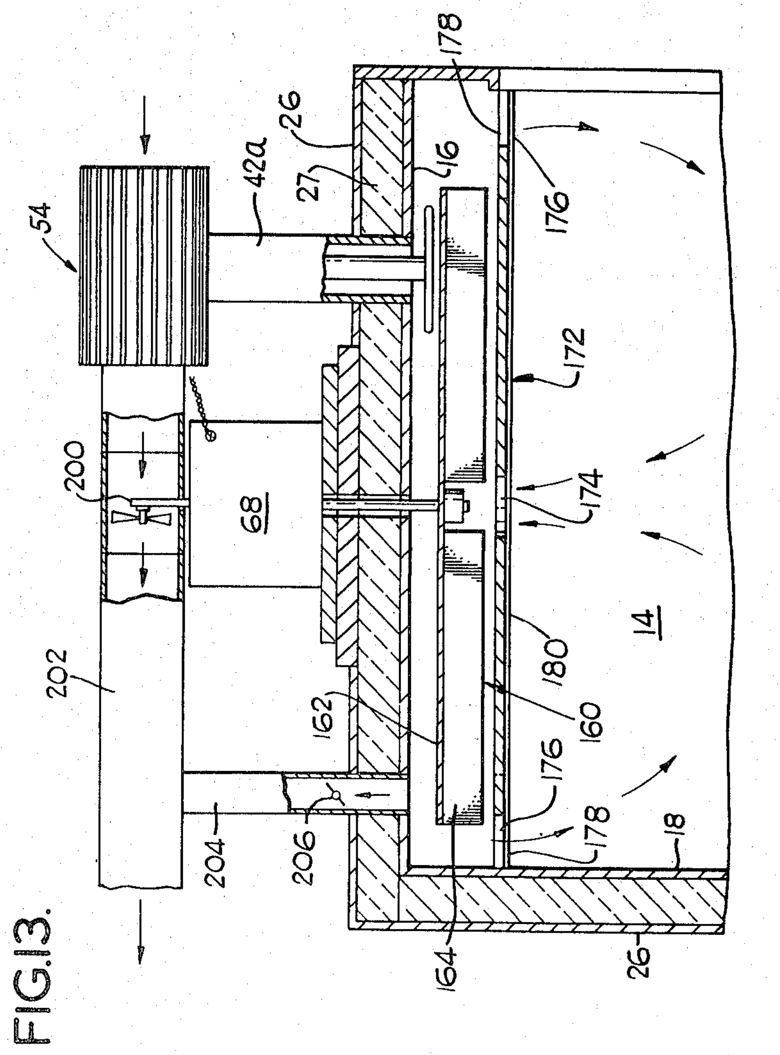
FIG. 13 is a sectional view of a part of cooking apparatus according to a further embodiment of the invention.
Figure 15:
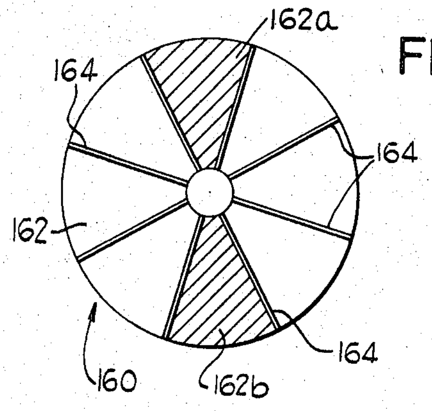
FIG. 15 is a plan view of a fan employed in the apparatus of FIG. 13.
Figure 15:
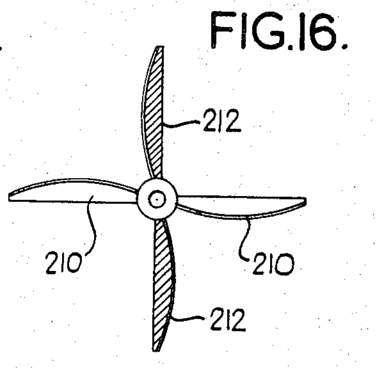
Figure 14:
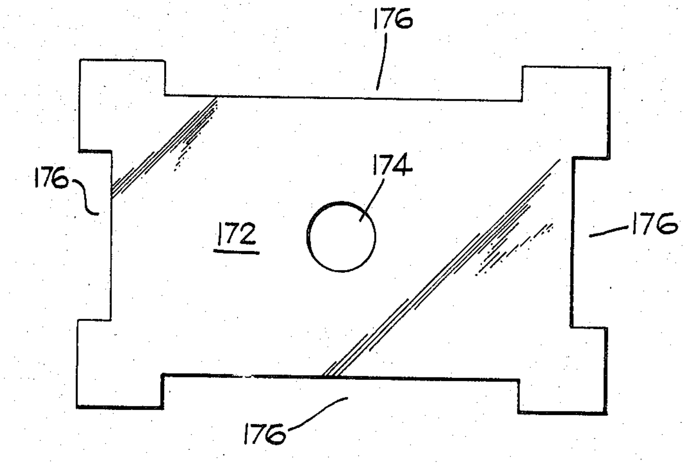
FIG. 14 is a plan view of a shield or plate employed in the apparatus of FIG. 13.

The embodiment of FIGS. 13 to 15 is basically similar to that of FIGS. 5 to 7, but instead of the air recirculating means being mounted at the back of the oven, it is mounted at the top. Further, the fan used for recirculating the air also serves as a mode stirrer, and the separate mode stirrer 44 is therefore dispensed with.

In FIG. 13, the air circulating fan is illustrated by the reference number 160 and is driven by the motor 68. The fan 160 is positioned and dimensioned so that it extends underneath the waveguide 42*a* and associated probe. The fan 160 comprises a disc 162 and blades 164 which are made of material transparent to microwave energy and resistant to heat, for example a ceramic material. Two opposed segments 162*a* and 162*b* of the disc 162 have a layer or coating of metallic material provided thereon, and it is these zones 162*a* and 162*b* which provide the mode stirring effect when the fan is rotated.

The shield plate, which in the embodiment of FIG. 5, would preferably be of metal, is in the embodiment of FIGS. 13 to 15 made of a microwave transparent and heat resistant material, again such as a ceramic. This is so that the microwave energy may pass into the main portion of the cavity substantially without being impeded by the shield plate. In FIGS. 13 and 14, the shield plate is indicated by the reference number 172 and as seen it includes a central opening 174 and cut away portions 176 on each side, providing spacings through which the air circulated by the fan may pass as indicated by the arrows. Thus, the plate 172 is supported by its corner portions 178, and these rest on ledges 180 provided in the oven. The plate 172 can be slid out for cleaning.

Thus, in this embodiment, when the motor 68 is energised air is drawn by the fan upwardly through the opening 174 and passes downwardly through the spaces 176 towards the hot-plate member 22, where it takes up heat, and is then drawn upwardly again over the surface of the food to be cooked and through the opening 174 for recirculation.

In the embodiment of FIGS. 13 to 15, the fan motor 68 is also used to drive a blower 200 which draws cooling air across the cooling fins (shown only diagrammatically) of the magnetron valve 54 (also shown diagrammatically) which in this embodiment is mounted on the top of the oven. The air is then expelled through a pipe 202. A duct 204 is connected between the cavity and the pipe 202 and is arranged so that the air flow through the pipe 202 produces a Venturi effect in the duct 204 for sucking out fumes and smoke etc. during cooking with the combination of microwaves and the hot-plate member. The pipe 204 contains a butterfly valve 206 which is partially closed when cooking with the combination of recirculated hot air and microwaves so as to provide merely for the avoidance of pressure build up in the cavity without exhausting too much of the recirculating hot air which, as indicated previously, would be undesirable as it would tend to dry out the food.

FIG. 16 illustrates an alternative form of fan. The fan shown in FIGS. 13 and 15 was of the centrifugal type whereas the fan in FIG. 16 comprises four blades 210 and 212 each of which is twisted to provide for the necessary air flow. The blades 212 are of metallic material whereas the blades 210 are of ceramic material. Thus the blades 212 act as a mode stirrer whereas the blades 210 do not impede the microwave energy. Again, the dimensions of the fan in FIG. 16 are such that the blades thereof extend underneath the probe for introducing microwave energy to the cavity.

Since the fan in FIGS. 13 to 16 has to be rotated rapidly to produce the required rapid recirculation of air, it will be understood that the dimensions of the conductive portions acting as the mode stirrer must be relatively small compared to the dimensions of conventional mode stirrers, which rotate relatively slowly, to avoid overloading the magnetron.

Although the invention has been described with particular reference to the cooking of steak and other meat products, it may also be used for cooking bakery products such as pies, and in particular good results can be obtained by cooking pizza pies with the combination of microwave energy and heat from the hot plate member 22 on which the pies are placed. It will be understood, however, that this application of the invention does not take advantage of the fact that the amplitude of the microwave field decreases to zero at the surface of the hot plate member.

Various modifications are possible within the scope of the invention. For example, alternative forms of heating means for the plate 22 are possible. For example, gas burners could be provided instead of the electric heating elements illustrated in the drawings. A suitable energizing means for energizing all of such heating means may be, for example, a switch or valve controlled by a knob on the control panel. Where means for heating and recirculating the air in the cavity is also provided, it is not essential that the fan be located in the cavity. The fan could be provided in suitable ducting connected to the cavity so that the air is withdrawn from the cavity and then passed back to it; and where auxiliary heaters for the air are provided these also could be outside the cavity, for example in the aforesaid ducting. Thus, in this modification the air would be withdrawn from the cavity heated and recirculated back to the cavity continuously. It is essential, however, that recirculated air be used i.e. the air should not be exhausted to atmosphere since if fresh air is continuously introduced to the oven and exhausted to atmosphere the vapours from cooking are lost and the food cooked may be dried out.

Although a drain hole has been illustrated in each of the embodiments shown in the drawings, this is optional. Under many cooking conditions it will be found that the hot plate member 22 is so hot that any fat or the like is burnt off and thus the drain hole may be unnecessary.

Although the hot plate member has been illustrated as being constituted by one of the walls of the cavity, this is not essential. The hot plate member could be separate from the walls of the cavity but it must nevertheless be electrically conductive in order to utilise the electrical effects illustrated in FIG. 4 of the drawings.

The walls of the cavity may be made of a variety of materials. The walls are referred to as electrically conductive since it is essential that they be screened against loss of microwave energy. Thus, suitable materials might be cast iron, stainless steel, or high temperature alloys. Where the accumulation of grease on the walls of the oven might be a problem, a material such as cast iron, whose surface can readily retain an anti-grease agent, might be employed. Conceivably it might be possible to make the walls of the cavity out of a heat resistant plastic or glass material provided that electrically conductive screening is incorporated.

Each embodiment of the invention has been illustrated in an oven which is provided with a door for cooking food in batches. The invention might be embodied in a conveyor type oven. In this case heating means for the conveyor, which would constitute a hot plate member, might be provided. The cavity might in this case be open ended so that food can be placed in at one end and removed at the opposite end after it has been cooked. In this case, the walls of the cavity might be constructed of any of the aforesaid materials according to the requirements of a particular apparatus.

It will be understood that where pastry is to be cooked in the oven, the temperature of the hot plate member may be lower than that required for cooking meat. For example, a temperature of 350° F. to 450° F. may be suitable for the hot plate member when cooking pastry. In this case, it is preferable that the thermostat controlling the heating elements of the hot plate member be capable of retaining the hot plate member at temperature down to 350° F.

Although in each of the embodiments illustrated in the drawings, the hot-plate member is such that the surface thereof with which the food is contacted is electrically conductive, it should be understood that a non-stick surface, which may be of insulating material, could be provided. Where such a non-conductive layer is provided on the surface of the hot-plate member, it should be sufficiently thin that the effects described with reference to FIGS. 4A and B can still be achieved.

I claim:

1. Apparatus for cooking for cooking food, comprising:

an electrically conductive member having a surface for contact with the surface of food to be cooked;

heating means for heating the member to a temperature such that food in contact therewith may be cooked thereby, said heating means and said member being such that said member may be maintained at said temperature while food in contact with said surface is cooked;

means for energizing said heating means;

electrically conductive wall means defining a cavity for containing microwave energy; said surface of said member being disposed in said cavity; and a microwave generator coupled to said cavity for supplying microwave energy thereto;

said heating means and said microwave generator being operable so that food in contact with said surface of said member may be cooked by the combination of heat generated in said food by said microwave energy and heat from said member, the depth of penetration of microwaves in food being cooked being limited by the short circuit effect of said conductive member on the microwave.

2. Apparatus according to claim 1, wherein said member is constituted by a portion of said wall means.

3. Apparatus according to claim 2, wherein said portion of said wall means is a bottom wall of said cavity.

4. Apparatus according to claim 1, wherein said heating means comprises an electrical heating element.

5. Apparatus according to claim 4, wherein said electrical heating element is embedded in said member.

6. Apparatus according to claim 1, wherein said heating means is capable of heating said member to at least 450° F.

7. Apparatus according to claim 1, wherein said heating means is capable of heating said member to temperatures in excess of 550° F.

8. Apparatus according to claim 1, wherein said heating means is capable of heating said member to temperatures up to at least 750° F.

9. Apparatus according to claim 1, including a thermostat which controls said heating means to maintain said member at a selected temperature.

10. Apparatus according to claim 9, wherein said thermostat is capable of maintaining the temperature of said member substantially constant at temperatures down to 350° F.

11. Apparatus according to claim 1, wherein said wall means are surrounded by heat insulation.

12. Apparatus according to claim 1, wherein a drain hole is provided for draining fat or the like from said cavity.

13. Apparatus according to claim 12, wherein said drain hole is so dimensioned relative to the wavelength of the microwave energy that loss of microwave energy through said drain hole is substantially prevented.

14. Apparatus according to claim 1, wherein a fan is provided for recirculating the air in said cavity and additional heating means is provided to heat the recirculated air to a temperature at which the air is effective for cooking the food, said microwave generator, said fan and said additional heating means all being operable at the same time for cooking food by the combination of heat generated in the food by the microwave energy and heat from said heated recirculated air.

15. Apparatus according to claim 14, wherein the additional heating means comprises an electric heating element situated inside said cavity behind a shield disposed to prevent radiant heat produced by said additional heating means from falling directly upon the food.

16. Apparatus according to claim 15, wherein said wall means includes a substantially vertical wall, and said shield is disposed substantially parallel to said vertical wall and spaced therefrom to define between the vertical wall and shield a space containing said additional heating means.

17. Apparatus according to claim 15, wherein the fan is disposed in said cavity.

18. Apparatus according to claim 17, wherein the fan is disposed behand said shield and is operable to draw the air through an opening in a central portion of the shield and to blow the air over the heating elements and around the edges of the shield.

19. Apparatus according to claim 14, wherein the additional heating means is operable to heat the air to temperatures in excess of 230° F.

20. Apparatus according to claim 14, wherein the additional heating means is operable to heat the air to temperatures in excess of 300° F.

21. Apparatus according to claim 14, wherein the additional heating means is operable to heat the air to a temperature in the range 230° to 550° F.

22. Apparatus according to claim 14, including a thermostat for controlling the additional heating means to maintain the air temperature constant at a selected value.

23. Apparatus according to claim 22, wherein the thermostat is capable of maintaining the air temperature constant at temperatures down to 150° F.

24. Apparatus according to claim 14, wherein a shelf is provided in said cavity for supporting food therein in a portion spaced from said wall means while cooking the food with the combination of microwave energy and heated recirculated air.

25. Apparatus according to claim 24, wherein the shelf is removable.

26. Apparatus according to claim 24, wherein the shelf is made of a metallic grid of which the grid spacing is chosen such that the microwave energy can pass therethrough.

27. Apparatus according to claim 1, wherein said heating means is capable of heating said member to such an extent that the air in the cavity is heated to temperatures at which the air is capable of cooking food placed in the cavity, and wherein a fan is provided for recirculating said air.

28. Apparatus according to claim 27, wherein the fan is located in said cavity.

29. Apparatus according to claim 28, wherein the fan is disposed behand a shield in the cavity and is operable to draw the air through an opening in a central portion of the shield and to blow the air around the edges of the shield.

30. Apparatus according to claim 29, wherein the wall means includes a vertical wall and the shield is disposed parallel to but spaced from the vertical wall to define a space in which the fan is located.

31. Apparatus according to claim 27, including a thermostat for sensing the temperature of the air and for controlling said heating means to maintain the air temperature at a selected level.

32. Apparatus according to claim 27, including a first sensor for sensing the temperature of said member, a second sensor for sensing the temperature of said air, switch means for coupling the heating means selectively to the first or second sensor so that the heating means is controlled to maintain the member or the air respectively at a selected temperature.

33. Apparatus according to claim 31, wherein the air temperature can be maintained at values in excess of 230° F.

34. Apparatus according to claim 31, wherein the air temperature can be maintained at values in excess of 300° F.

35. Apparatus according to claim 31, wherein the air temperature can be maintained at values within the range 230° to 550° F.

36. Apparatus according to claim 31, wherein the air temperature can be maintained at values within the range 150° to 550° F.

37. Apparatus according to claim 1, wherein ridges are formed in said surface of said member for producing a predetermined pattern on the surface of food cooked in contact with said surface.

38. Apparatus according to claim 37, wherein a removable auxiliary plate of heat-conductive material is provided for placing in contact with said surface of said member, said auxiliary plate having a plane surface for contact with food to be cooked.

39. Apparatus according to claim 38, wherein the surface of said auxiliary plate opposite to said plane surface is ridged complementarily to the grooves of said surface of said member for providing intimate thermal contact between said member and said auxiliary plate.

40. Apparatus according to claim 37, wherein said member is constituted by a bottom wall of the cavity, and a drain hole for the removal of fat or the like from said cavity is so arranged that fat or the like may drain from said grooves into said drain hole.

41. Apparatus according to claim 40, wherein said drain hole is so dimensioned relative to the wavelength of the microwave energy that substantially no microwave energy is lost therethrough.

42. Apparatus according to claim 4, wherein the side of said member opposite said surface is provided with a channel in which said electrical heating element is disposed, and wherein said member is removable to expose the heating element for servicing.

43. Apparatus according to claim 14, including means for preventing the heating means for heating the member and the additional heating means from being energised at the same time.

44. Apparatus according to claim 1, including means for heating the air in the cavity to a temperature at which said air is capable of cooking the food placed therein and a fan operable for forcibly recirculating said air, said fan including portions of heat resistant microwave transparent material and portions of conductive material and being disposed in said cavity to act as a mode stirrer, said apparatus being operable for cooking food by the combination of microwave energy and said heated air recirculated by said fan.

45. Apparatus according to claim 44, including a shield member disposed adjacent to but spaced from a wall of said cavity and defining a space within which said fan is located, said shield member having a central opening therein and said fan being operable to draw said air through said central opening and blow said air around the edges of said shield member, said shield member being made of heat resistant microwave transparent material.

46. Apparatus according to claim 45, wherein said space is defined between said shield member and a top wall of said cavity.

47. Apparatus according to claim 46, wherein said means for heating said air is constituted by said heating means for heating said hot plate member.

48. Apparatus according to claim 44, including adjustable vent means connected to said cavity, blower means operable for producing a Venturi effect in said vent means for drawing air from said cavity, and a single motor driving said blower and said fan, said vent means in a partially closed condition preventing build up of pressure in said cavity and in a fully open position permitting exhaust of smoke and fumes therefrom.

49. Apparatus according to claim 48, wherein said blower further operates to cool said microwave generator.

50. Apparatus according to claim 1, wherein said member is substantially imperforate.

51. Apparatus according to claim 1, wherein drain means are formed in said member and said member is otherwise imperforate.

52. Apparatus according to claim 1, wherein said member is a plate of substantial thickness whereby said temperature may be maintained while food in contact with said surface is cooked.

53. Apparatus according to claim 1, wherein said member is a plate of thickness substantially greater than that of said wall means.

54. Apparatus according to claim 1, wherein said heating means comprises an electrical heating element in contact with said member for supplying heat thereto by conduction.

References Cited

UNITED STATES PATENTS

| | | | |
|---|---|---|---|
| 3,320,396 | 5/1967 | Boehm | 219—10.55 |
| 3,427,171 | 2/1969 | Jeppson | 219—10.55 |
| 3,662,141 | 5/1972 | Schauer | 219—10.55 |

FOREIGN PATENTS

| | | | |
|---|---|---|---|
| 1,172,918 | 12/1969 | Great Britain | 219—10.55 |

R. F. STAUBLY, Primary Examiner

H. D. JAEGER, Assistant Examiner

U.S. Cl. X.R.

99—107